March 22, 1966 J. A. AILEO 3,241,154
SAFETY HELMETS
Filed Dec. 3, 1963 6 Sheets-Sheet 1
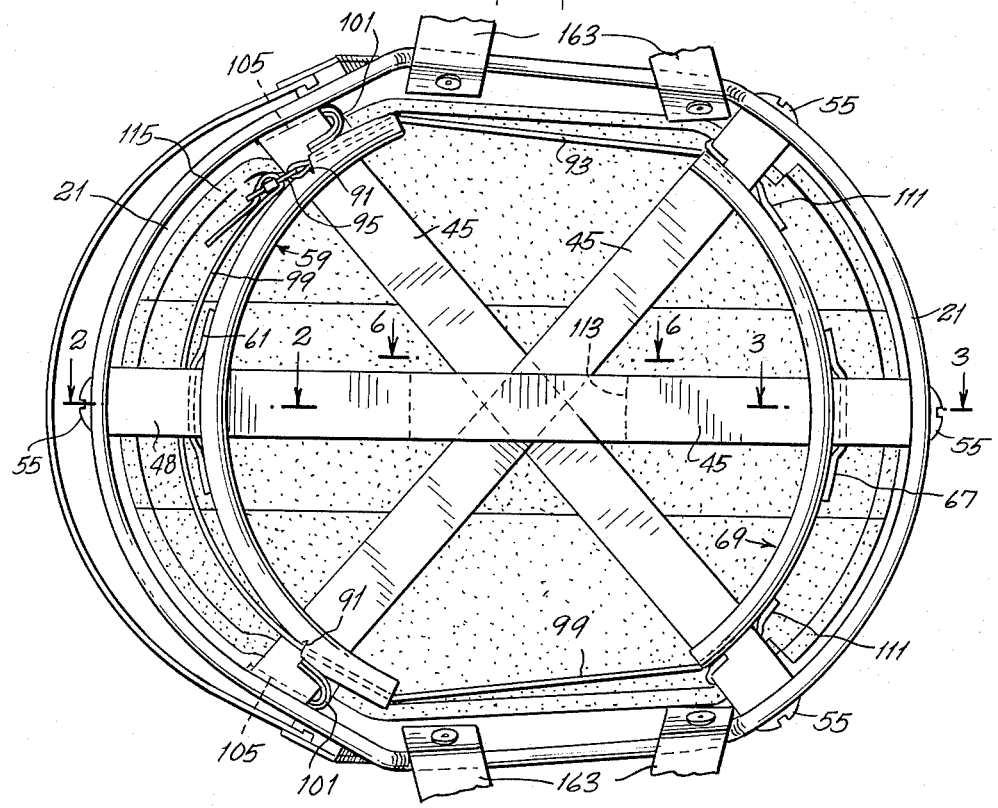
Fig. 1.
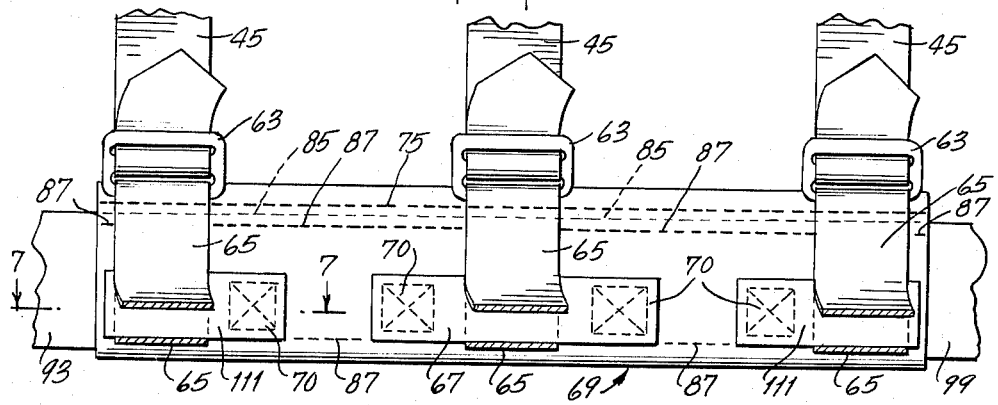
Fig. 5.
Fig. 7.
INVENTOR.
JACKSON A. AILEO
BY Lester W. Clark
ATTORNEY

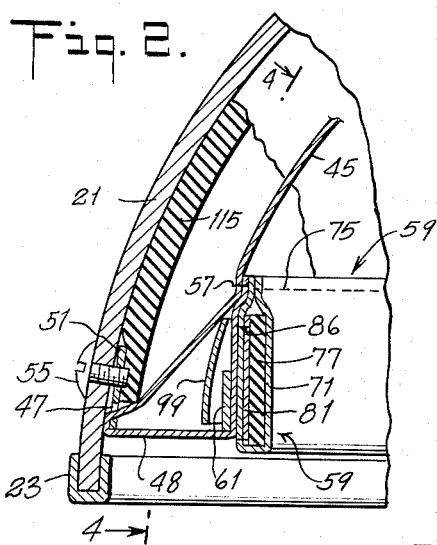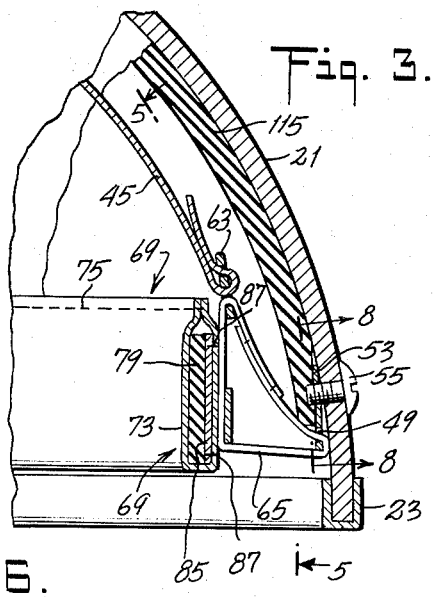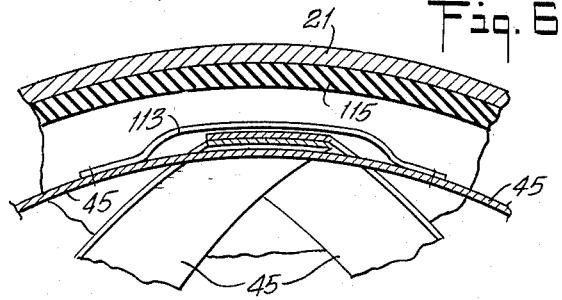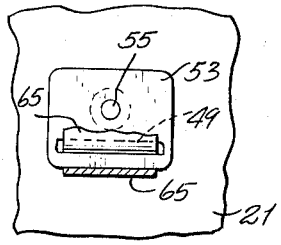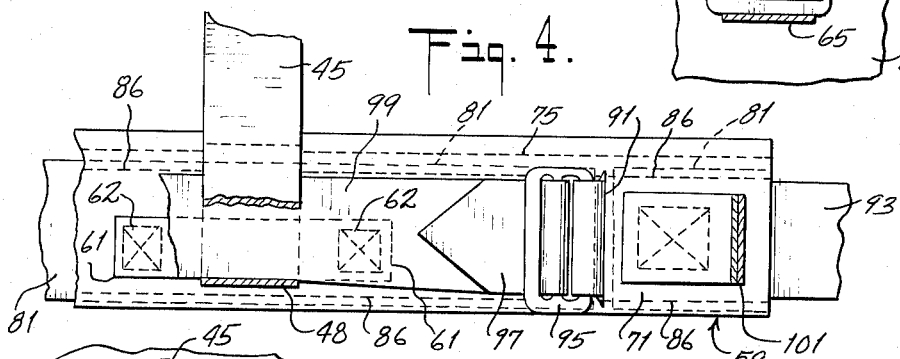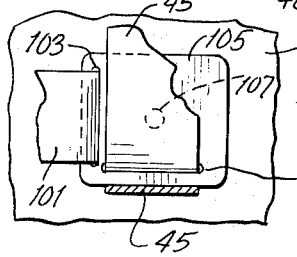

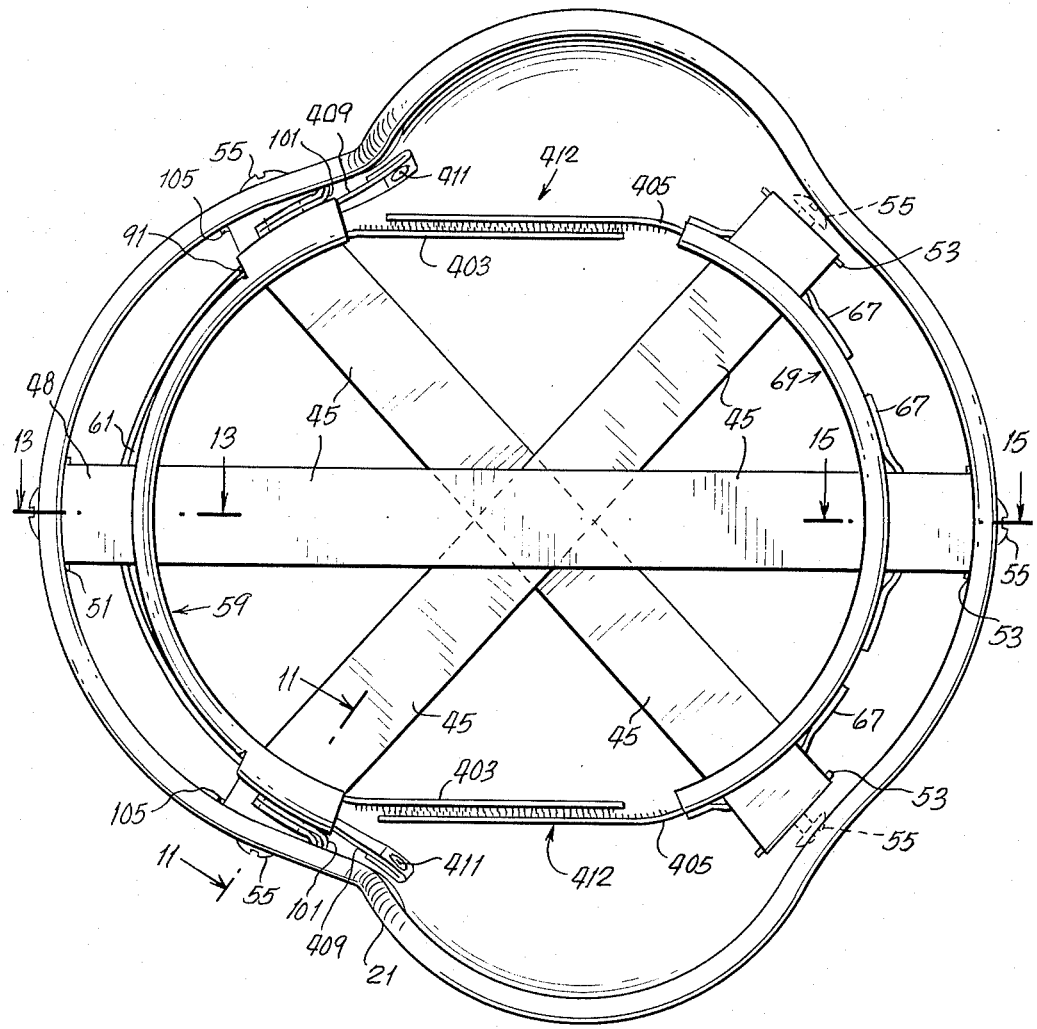

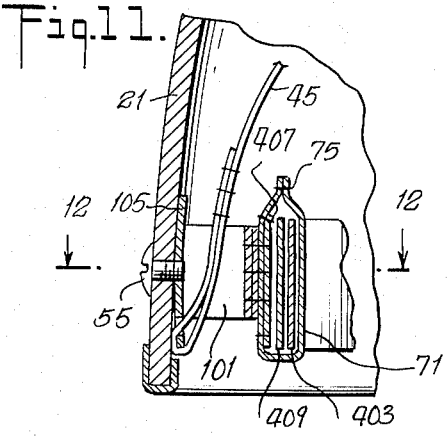
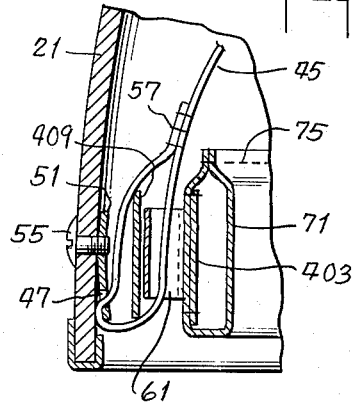
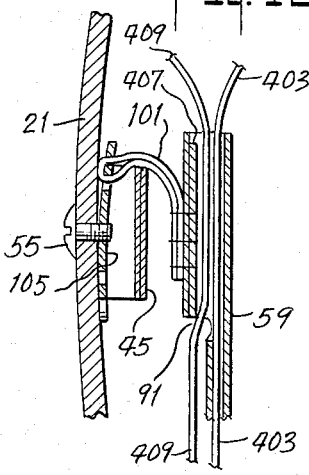
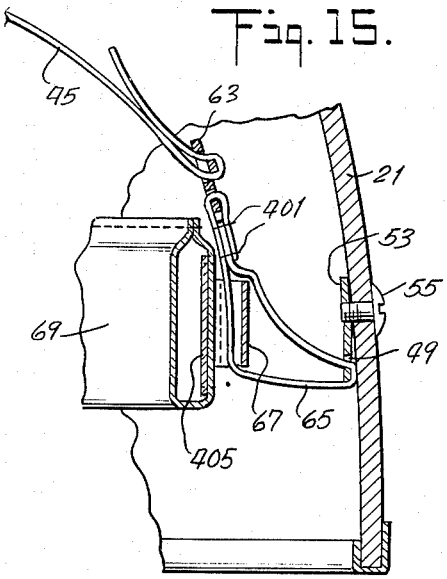
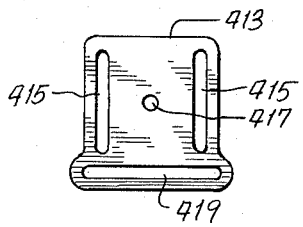
INVENTOR.
JACKSON A. AILEO
BY Lester H. Clark
ATTORNEY INVENTOR.
JACKSON A. AILEO
BY Lester W. Clark
ATTORNEY

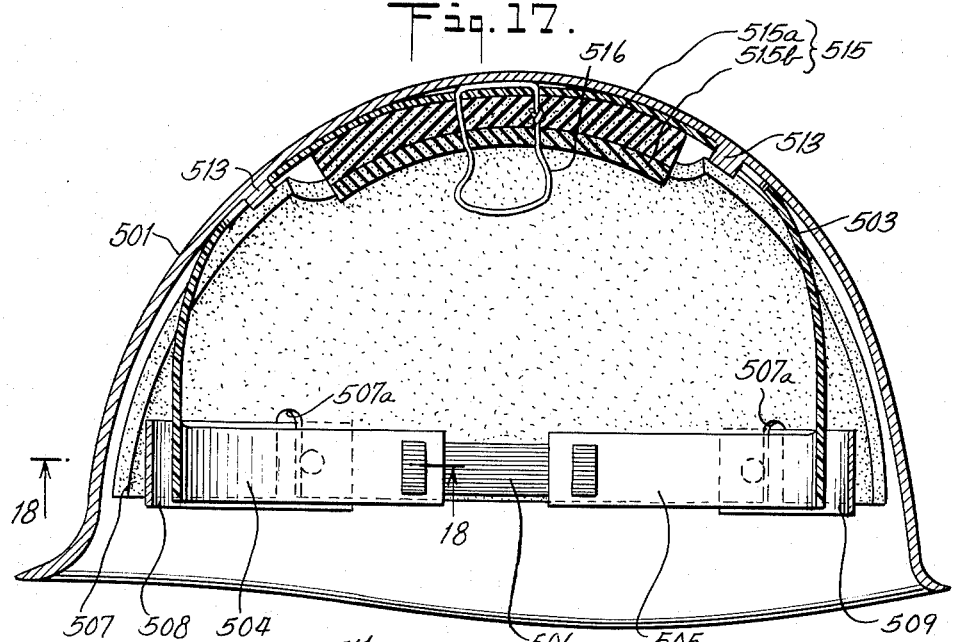
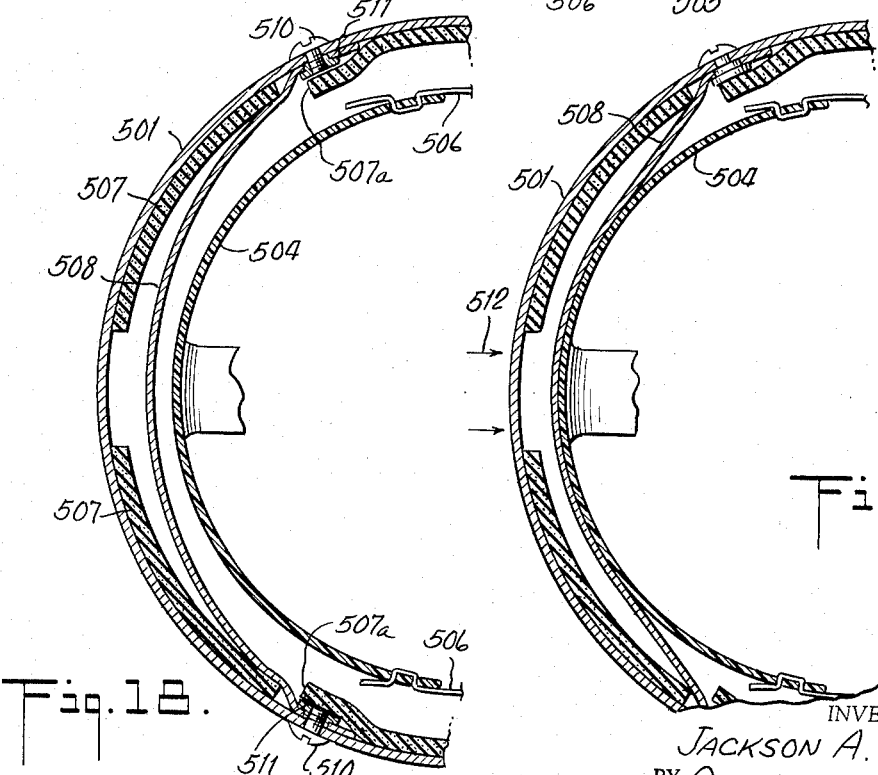

United States Patent Office 3,241,154
Patented Mar. 22, 1966

3,241,154
SAFETY HELMETS
Jackson Anthony Aileo, Carbondale, Pa., assignor to
Leonard P. Frieder, Great Neck, N.Y.
Filed Dec. 3, 1963, Ser. No. 327,594
21 Claims. (Cl. 2—3)

This application is a continuation-in-part of my copending application, Serial No. 29,026, filed May 13, 1960, entitled Rigid Shell Helmet and Rigging and Sound Attenuating Means Therefor.

This invention relates to a protective helmet and more especially to a helmet providing a rigid outer shell for warding off blows and impacts. The invention particularly relates to improved means for supporting the shell upon and in spaced relation to the head of a wearer.

Such helmets commonly have a crown rigging structure for supporting the weight of the helmet on the head, and headband means for engaging at least the forhead and the back of the head of the wearer. In some helmets, the headband means is a continuous band extending entirely around the wearer's head. The crown rigging and the headband means are disposed in spaced relation to the rigid shell of the helmet, for the purpose of reducing the effect on the head of a blow upon the shell.

In order to make a helmet fit a wearer, the straps which make up the crown rigging and the headband means must both be made adjustable as to length. Any length adjustment necessarly introduces a variation in the spacing between the shell and either the crown rigging or the headband means, or both. The adjustable structures of the rigging and of the headband means commonly provide a wide range of adjustment so that a particular helmet can be adjusted to suit a wide range of head sizes.

It has been discovered that a wearer may sometimes adjust his crown rigging and his headband means in a manner which reduces the spacing between the rigid shell and the wearer's head to the point where there is a substantial danger of contact between the shell and the head as the result of a blow from an external object, with the resultant possibility of the transfer of kinetic energy from the external object directly to the head.

This problem has been previously recognized. A partial solution of it is described in U.S. Patent No. 2,926,355, issued to Walter S. Finken on March 1, 1960. That patent shows an arrangement of cooperating front and rear headband elements, wherein the front headband element is of fixed length, so that the head size adjustment must be made entirely on the rear headband element. Consequently, the spacing between the wearer's forehead and the shell is fixed by the manufacturer, and cannot be disturbed by the wearer. The protection of the wearer's head from blows at the front of the helmet was assured by that arrangement.

The adjustment of the headband size my manipulating only the rear headband element while leaving the front headband element fixed, has the effect of shifting the center of gravity of the helmet with respect to the wearer's head. While this shift is not troublesome for most wearers, an extreme adjustment for a small or large head size may shift the helmet center of gravity to the rear or to the front so far as to cause a continuous tendency to tilt, with resulting discomfort to the wearer.

It is an object of the invention to provide in a helmet having a rigid shell open at the lower side thereof, improved rigging means for supporting the helmet on the head of the wearer.

It is another object of the invention to provide a helmet having a headband with improved means for adjusting the headband to the head size of the wearer, while limiting the adjustment so that the spacing between the wearer's head and the shell cannot be dangerously reduced.

The helmet of the invention comprises a rigid shell made of suitable material which may be of known composition, for example a plastic binder reinforced by a glass fiber mat, which is capable of being molded to shape as a hollow shell open at the lower side thereof for receiving the head of the wearer, the opening being defined by the edge of the shell extending about the head generally horizontally. In this shell are disposed a plurality of head straps crossing each other at the crown portion of the head. The ends of these head straps are secured to the shell at the inner surface thereof adjacent the edge portion extending about the opening. Each of these straps is provided with means for readily adjusting the length thereof so that the vertical distance from the edge of the opening to the crown of the head may be made greater or less. These head straps, moreover, cooperate with means carried by the headband, which is preferably made in separate forward and rear sections, to hold the headband or its sections in spaced relation to the shell when these sections are adjusted to fit the head of the wearer. For this purpose the headband or its two sections may be provided with saddle straps or loops which interlink with loops on the head straps and provide for relative sliding movements of the headband sections and the head straps.

The headband sections, in certain embodiments of the invention, are of tubular form, and a draw strap extends freely through at least a portion of one of the tubular headband sections, in order that the effective length of the headband may be increased or decreased to fit the wearer's head. In one embodiment, the draw strap extends into the respective open ends of one of the tubular headband sections and out through slits in the outer wall of this tubular headband section, so that a portion of the draw strap is disposed between the tubular headband section and the shell. Adjusting means, such as a buckle, is provided in that portion of the draw strap so that the length of the headband may be varied. This draw strap, if desired, may extend throughout the length of the other headband section. In some cases it may be free to move endwise within either tubular headband section.

In another embodiment of the invention, however, this draw strap may be secured as by stitching to one tubular headband section, preferably to the wall of the tubular headband disposed toward the shell, so as to reinforce this wall of the headband to resist strains brought thereon by the pull of the draw strap and by the pull of the head straps. The headband sections also may be provided with cushion strips extending lengthwise in the tubes thereof so as to be disposed at the side of the tubular headband sections which is engaged by the head of the wearer.

In all the embodiments of the invention, each headband element is prevented from moving into contact with the shell by the provision of a headband movement limiting means comprising flexible inelastic means extending between two points spaced apart along a concave surface of the shell and shorter than the distance between those points along that surface. In certain of the embodiments described herein, the inelastic means is a separate strap fixed to the shell at its ends and located between one of the headband sections and the shell. In another embodiment, the inelastic means comprises a portion of the headband section, and inelastic connections between the ends of that section and the shell.

Other objects and features of the invention will be understood from the following specification and drawings in which:

FIG. 1 is a bottom plan view of a helmet embodying the invention, showing the parts within the shell;

FIG. 2 is a vertical longitudinal section of line 2—2 of FIG. 1;

FIG. 3 is a vertical longitudinal section on line 3—3 of FIG. 1;

FIG. 4 is a section taken along arcuate line 4—4 of FIG. 2 and showing a head strap and the forward headband and cooperating parts;

FIG. 5 is a section on line 5—5 of FIG. 3 showing the head straps and the rear headband and cooperating parts;

FIG. 6 is a section on line 6—6 of FIG. 1;

FIG. 7 is a section on line 7—7 of FIG. 5;

FIG. 8 is a section on line 8—8 of FIG. 3 showing a head strap engaging plate secured to the shell;

FIG. 9 is an elevational view of a plate secured to the shell and engaged by a head strap and by a loop for holding the end of the forward headband.

FIG. 10 is a bottom plan view of a different helmet, embodying a modification of the invention;

FIG. 11 is a cross-sectional view taken on the line 11—11 of FIG. 10;

FIG. 12 is a cross-sectional view taken on the line 12—12 of FIG. 11;

FIG. 13 is a cross-sectional view taken on the line 13—13 of FIG. 10;

FIG. 14 is an elevational view of a plate adapted to be secured to the shell of FIG. 10, for the attachment of a head strap and a headband;

FIG. 15 is a cross-sectional view taken on the line 15—15 of FIG. 10;

FIG. 17 is a sectional view along the line 17—17 of FIG. 16;

FIG. 18 is a sectional view along the line 18—18 of FIG. 17;

FIG. 19 is a view similar to FIG. 18, showing the parts in a different position;

FIGURES 1-9

Figure 16:
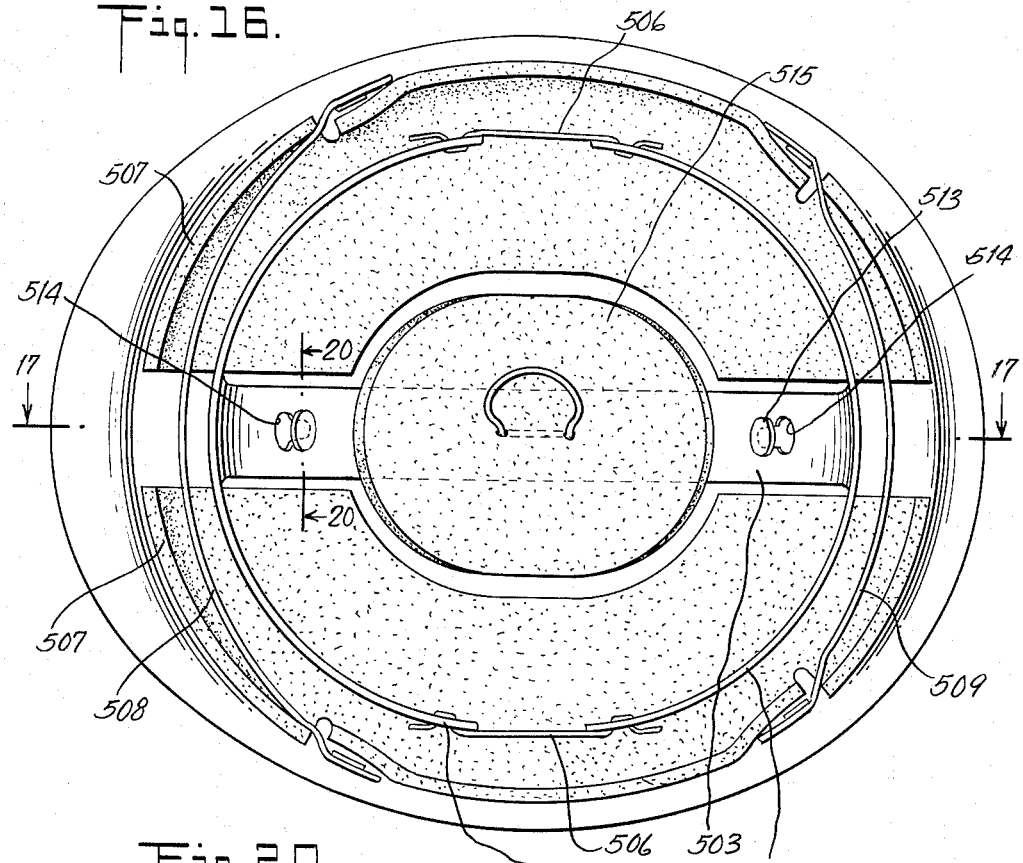
FIG. 16 is a bottom plan view of another helmet, showing a different embodiment of the invention.

In these figures there is shown a helmet having a rigid shell 21 of suitable material and having an opening at the lower side thereof for receiving the head of the wearer and defined by an edge covered by a rubber channel 23. The shell is adapted to be supported on the wearer's head by a crown rigging including head straps 45 and headband means including headband sections 59, 69.

Three head straps 45 are connected at their opposite ends to the shell and extend from these connections upwardly and over the crown of the wearer's head, so as to support the weight of the shell upon the crown of the head of the wearer. As shown in FIGS. 2 and 3, which show the middle or fore-and-aft head strap, the head straps 45 are connected at their end portions to the shell by extending through openings or slots 47, 49 formed in plates 51, 53 secured by screws 55 threaded in the plates and extending through the shell from the outside, the heads of the screws being provided with screw driver slots. The head strap 45 in FIG. 4 extends through the slot 47 and is doubled back to form a loop 48, the end of the strap being sewed to an intermediate point 57 of the strap, which point 57 is disposed in this embodiment at the top of a forward headband section 59 adapted to extend across the forehead of the wearer. A saddle strap 61, FIG. 4, which is sewed at its ends by stitches 62 to the headband section 59 so as to provide a space for the loop 48 of the head strap 45 in FIG. 2 to pass freely. This saddle strap provides for loose engagement with the loop 48 of the headband section 59 so that limited relative movement may take place between the headband section 59 and the loop 48.

As shown in FIG. 3, the rear portion of the head strap 45 which passes directly over the crown of the head from the front is passed through a buckle 63, so that the length of the head strap 45 between this buckle and the loop 48 at the front of the shell may be increased or decreased to suit the size and shape of the head of the wearer. The buckle 63 is in engagement with a fabric loop 65 which extends through a slot 49 of a plate 53 and also passes between a saddle strap 67 and a rear headband section 69 to which strap 67 is secured by stitching 70 (FIG. 5). The loop 65 is in loose relation to the saddle strap 67 and to the headband section 69 so that the headband section may move upwardly and downwardly somewhat on the vertical portion of the fabric loop 65. Each of the head straps 45 is provided with a similar buckle and loop arrangement, as shown in FIG. 5.

As shown in FIGS. 2 and 3, the headband sections 59, 69 include tubular members 71, 73 which are preferably formed from elongated strips of soft pliable sheet material, e.g., leather, by folding the strips along the middle thereof, with the fold parallel to the long dimension, and sewing the edges together by stitching 75. Within the tubular members are disposed resilient pads 77, 79 which may be of foam rubber or similar resilient material. The resilient pads 77, 79 may be secured to the tubular members 71, 73 by any suitable means, preferably by an adhesive. Thus, the head of the wearer is in engagement with a soft resilient part for comfort as well as for easy adaptation of the headbands to the forehead and to the back of the head of the wearer.

Within the tubular members 71, 73 and to the inner side of the walls thereof to which are stitched the saddle straps 61, 67 also are stitched reinforcing fabric strips 81, 85. The fabric strip 81 for the forward headband section 59, FIG. 1, may extend throughout the length of this section or may extend only through a portion of the section adjacent and somewhat beyond both ends of the saddle strap 61. Having regard to means for holding this headband section 59 at its ends to the shell, the fabric strip 81 may be secured by two rows of stitching 86 to the forward wall of headband section 59, as hereinafter described. A continuous reinforcing strip 85 may be similarly disposed in the rear headband section 69 and stitched to the rearwardly disposed wall thereof by stitching 87, as shown in FIG. 7.

The forward tubular member 71, as shown in FIGS. 2 and 4, has formed in the outer ply thereof two vertical slits 91, spaced a short distance from the respective ends of the tubular member. A draw strap 93 has one end sewed, to the upper end, as viewed in FIG. 1, of the rear headband section 69 and preferably within the tubular member 73 thereof. This draw strap extends forwardly and into the open end of the tubular member 71 and through the adjacent slit 91 therein and its other end is fixed to a buckle 95. A cooperating draw strap 99 has one end sewed to the lower end, as viewed in FIG. 1 of the tubular member 73. The draw strap 99 extends forwardly into the open end of the tubular member 71 and thence through the other slit 91 and continues in the space between the forward wall of the headband section 59 and the adjacent wall of the shell to its other end, which is adjustably attached to buckle 95. The draw strap 99 also passes, as shown in FIG. 4, through the loop 48 of the middle head strap 45. It will be understood that by adjusting the buckle 95 the two sections 59, 69 of the headband may be disposed in greater or less separation so as to fit properly respectively to the forehead and to the back of the head of the wearer. This adjustment of the buckle 95 may be made readily in the space between the forward headband section 59 and the wall of the shell.

If desired, the draw straps 93 and 99 may be made in one piece extending continuously through the rear tubular member 73. Such a draw strap may pass slidably through the tubular member 73, or it may be sewed or otherwise secured to the tubular member 73.

Each end portion of the forward tubular member 71 which is disposed between one of the slits 91 and an end of that member may be reinforced with a fabric strip sewed to the outer wall of this portion of the tubular member. At each end of the tubular member 71, a loop 101 (FIGS. 1 and 4) has its ends sewed to an end portion of the tubular section member 71, the loop 101 passing through a slot 103 in a plate 105, FIG. 9, secured by screw 107 to the shell 21. The screw 107 is not shown in FIG. 1 but is disposed adjacent the edge portion 23 of the shell. The loop 101 is shown in FIG. 1 and in FIG. 9 at that side of the helmet which is at the left of the head when the helmet is in position on the head. At the opposite side of the head, however, a similar loop 101 may be looped through a slot 103 in a plate 105 of opposite hand disposed at the right hand side of the helmet when in place on the head. The plates 105 are also provided with horizontally extending slots 109 through which the diagonal head straps 45 are looped similarly to the middle head strap 45 which is looped through the plate 51 as in FIG. 2. It will be understood that by means of the loops 101 the ends of the headband section 59 into which the draw straps 93, 99 enter are held flexibly but against free movement away from the shell at the two sides of the helmet and operation of the buckle 95 is effective to shorten and to lengthen the draw strap and, therefore, to determine the position of the head band sections 59, 69 relative to each other.

The headband section 59, and the two loops 101 which fasten its ends to the shell 21, are so dimensioned that their total length between the two points of fastening of loops 101, measured along the headband section 59, is shorter than the distance between the same two points of fastening, measured along the inner surface of shell 21. Furthermore, the headband section 59 and the loops 101 are made of substantially inelastic, i.e., non-stretchable, materials. Hence, this dimensional relationship establishes a minimum limit to the spacing between the shell 21 and the headband section 59, which thereby also establishes a minimum limit to the spacing between the shell 21 and the wearer's head. Therefore, as long as the headband section 59 and loops 101 remain intact, the front portion of the shell cannot contact the wearer's head, and no impact energy can be transmitted directly through that portion of the shell to a localized area of the wearer's head. Since it has been determined from practical experience that this front portion of the shell is the region most likely to receive impacts from external objects, this protection is provided in the region where it is most needed.

Regardless of the limitations of movement of the headband section 59, which limitations are imposed by the structures described above, it should be noted that adjustment of the head size by buckle 95 is effectively distributed between front headband section 59 and rear headband section 69, so that the center of gravity of the helmet is not shifted substantially with respect to the wearer's head by that adjustment, even at the extreme ends of the adjustment range.

Where the draw strap is made as a single piece extending slidably through the rear headband section 69, the buckle 95 may be disposed in any desired position along the front headband 59 between the slits 91 or this buckle may be disposed at either side of the head between the ends of the headband sections 59, 69. The disposition shown in FIG. 1, however, is preferred because the buckle is not in a position where it may contact the head and it is well supported by the headband 59.

As shown in FIGS. 5 and 7, the saddle straps 111 disposed adjacent the ends of the headband 69 and corresponding to the saddle straps 67 are formed with a reverted portion extending about the loop 65 of the diagonal head strap 45 and stitched to the adjacent tubular member 73. This arrangement serves to hold the end of the tubular member 73 so that it extends along the shell by virtue of the engagement of the loops 65 of the head straps 45 with the plates 53 disposed at ends of the headband section 69. The saddle straps 67 and 111 preferably are made of an elastic tape so as to provide for elastic movement of the headband relative to the loops 65 of the head straps to aid in easy fitting of the headbands to the head.

As shown in FIGS. 1 and 6, at the location where the head straps 45 cross at the crown of the head, a restraining strap 113 is stitched to the middle head strap 45 and extends over the two diagonal head straps 45 in loose relation thereto so that each of the head straps may be moved relative to the others but all of the head straps at this crossing are retained in the general location of the crown at the head.

In helmets of this type it is desirable to provide an inner lining of shock absorbing materials. In the embodiment being described the lining 115 is made of foam rubber which extends over the inner surface of the shell 21. Alternatively, a resilient foam material having somewhat greater energy absorbing qualities than foam rubber may be used. This lining may be held in place by virtue of the form thereof, as described in the U.S. patent to Jackson A. Aileo, No. 3,055,013, issued September 25, 1962.

In the manufacture of the helmet the rigging comprising the head straps 45 and the headband forward and rearward sections 59, 69 may be assembled outside the shell with the attachment plates 51, 53, 105 and with the draw straps and buckles in place and this assembled rigging may be mounted in the shell by inserting the screws 55, 107 through the shell 21 into engagement with the plates.

FIGURES 10–15

As shown in FIG. 10, a rigging of modified construction may be provided which utilizes headband sections 59, 69 as in FIG. 1. Also provided are three head straps 45 extending across the crown portion of the head as in FIGS. 1, 2, 3 and 6. The middle headstrap is provided at its forward end with a loop 48 which passes between and envelops a saddle strap 61 stitched to the wall of the headband section 59 at the side thereof toward the shell 21 as in FIGS. 2 and 4. The end of the middle head strap 45 is then passed through a slot 47 in plate 51 secured to the shell 21 by screw 55 as in FIGS. 4 and 15. The forward end of this strap is secured to an intermediate point on the strap by stitching 57 so as to form the loop 48. The loop 48 is not secured to the saddle strap 61 and limited movement may take place between the headband 59 and the loop 48 and therefore between the headband 59 and the shell 21. It will be understood that the loop 48 and the saddle strap 61 cooperate to limit substantial separating movement between the headband 59 and the shell 21. A certain amount of movement may be obtained, however, if the saddle strap 61 is made elastic, as suggested above.

The rearward end portion of the middle strap 45 may be provided with a buckle 63, as shown in FIG. 15, provided with slots through which an end of the strap passes to function the same as in FIGS. 3 and 5. The buckle 63 also has a slot to which one end of a loop 65 is fixed and the two ends of this loop are stitched together as shown at 401, FIG. 15. The loop 65 extends between the rearward wall of the rear headband section 69 and a saddle strap 67 stitched to this rearward wall. It also passes through slot 49 of plate 53 secured to the shell 21 by screw 55, the same as in FIG. 3.

The forward headband section 59, FIG. 10, includes a tubular member 71 as shown in FIGS. 11 and 13 and is provided, adjacent the respective ends thereof, but spaced from those ends, with slits 91 the same as in FIG. 1. This headband section, tubular and formed of flexible material, such as leather, and stitched at 75 at its upper side the same as in FIG. 4 is open at its ends and receives a forward adjusting strap 403 extending therethrough. This adjusting strap may be free as shown in FIG. 11 for movement lengthwise thereof within the headband section 59 or it may be secured to the inner ply of the tubular member 71 as by stitching. The end portions of the adjusting strap 403 are disposed at the side of the head of the wearer of the helmet and each carries one element of an adjustable fastening means 412 hereinafter described.

Within and extending through the tubular rear headband section 69 constructed the same as in FIG. 3, and as shown in FIGS. 10 and 15, is disposed a rearward adjusting strap 405 which may be free for movement lengthwise thereof within the headband section 69, or may be secured thereto as by stitching. The end portions of the rearward adjusting strap 405 are brought forward and disposed in lapping relation to the respective end portions of the forward adjusting strap 403 and each carries one element of the adjustable fastening means 412. The rearward adjusting strap 405 may have a certain amount of vertical movement relative to the head straps 45 and therefore relative to the shell 21 by virtue of the saddle strap 67 between which and the rearward wall of the headband section 69 the loops 65 pass. The saddle strap 67 and the loops 65, however, cooperate to limit separating movement of the rear headband section 69 and the shell. In the case also a certain amount of such separating movement may take place if the saddle straps 67 are made of elastic material.

The forward headband section 59 is held at the end portion thereof between slits 91 and the respective open ends of the tubular headband section by loops 101 stitched to the forward walls of the respective end portions, as shown in FIG. 11. The loops 101 pass through slots 103 in plate 105 secured by screws 55 to the shell the same as in FIGS. 2 and 4. The forward walls of these end portions carry reinforcing elements 407 which may be of fabric at the inside of these walls and stitched thereto as shown in FIGS. 11 and 12 to strengthen these end wall portions to resist the pull of the adjusting straps 403, 405 and the pull exerted thereon, if the shell 21 is moved forwardly by a blow upon the rear thereof.

In the embodiment of FIG. 10 an additional substantially inelastic, i.e., unstretchable restraining strap 409 is provided, secured at its ends by fasteners 411 to the side portions of the shell. The restraining strap 409 passes through the portions of the tubular headband section 59 disposed between the slits 91 and the open ends of this headband section. The restraining strap 409 passes out through slits 91 and then through loop 48 exteriorly of the saddle strap 61. As the restraining strap 409 is not stitched to the end portions of the headband section 59, slight movement may take place between these portions and the restraining strap lengthwise thereof. The length of the restraining strap 409 between the two fasteners 411 is made shorter than the distance along the inner surface of shell 21 between those two fasteners. If, for example, the shell is struck at the forward side and forced somewhat toward the forehead of the wearer, the restraining band 409 will be drawn rearwardly at its ends and a rearward force will be applied thereby to the headband section 59 throughout the length of that section. Hence, the force of a blow applied to the outside of the front of the shell will be distributed over the forehead, thereby forcing the wearer's head back and restraining the shell 21 from coming directly into contact with the head of the wearer.

The restraining strap 409 therefore reinforces the tubular member 71 and the loops 101 and assists them in the function of establishing a minimum limit to the spacing between the shell 21 and the front headband portion 59. The fastening means 412 above mentioned carried by the end parts of the adjusting straps 403, 405 may be any suitable means, e.g., snap fasteners, by which the two lapping end portions may be positioned relative to each to secure a snug fit of the headband sections 59, 69 to the head of the wearer. Preferably a device is used which includes on the respective overlapping parts elements upstanding therefrom which are capable of being entangled with each other but which may be separated to release the overlapping parts for readjustment thereof. A commercial device known as a "Velcro" fastener is suitable for this purpose.

In FIG. 14 is shown a plate 413 which may be used in place of the plates 51, 53, 105 to hold the different loops to the shell 21. The plates 51, 53 are provided only with horizontal slots 47, 49 to receive respectively the loops 48, 65. The plate 105 is provided with horizontal slot 109 and a single vertical slot 103 to receive the loops 101. While in some cases the plate 105 may be flat and may be reversed at the two sides of the shell to dispose the slot 103 in proper relation to the loops 101, in other cases where the plate is required to conform to the shell, right and left hand plates would be required to dispose the vertical slot 103 in position to receive the loop 101. The plate 413 avoids these requirements by providing two vertical slots 415 disposed symmetrically with respect to the threaded hole 417 for receiving the screw securing the plate to the shell 21, so that this plate may be used at either side of the shell for engaging loop 101. The plate 413 also is provided with horizontal slot 419 for receiving the loops of the head straps 45 as do the slots 47, 49, 109 of the plates 51, 53, 105 above described. Thus the plate 413 serves for connecting any or all of the headstrap to the shell 21. Although the helmet of FIGS. 10–15 is shown without a lining, it should be understood that it may be lined with a compressible material of high energy absorbing qualities, or alternatively with foam rubber, as in the element of FIGS. 1–9.

FIGURES 16–21

These figures disclose a third embodiment of my invention, which comprises a helmet including a rigid shell 501 adapted to be supported on the head of a wearer by means of a one piece plastic rigging generally indicated at 502 and consisting of a single headstrap 503 extending fore and aft over the crown of the wearer's head, a forward semicircular headband member 504 and a rear semicircular headband member 505. The two headband members 504 and 505 are integrally connected at their centers to the ends of the headstrap member 503. The ends of the headband members 504 and 505 are connected by elastic straps 506, which extend sinuously through slots provided in the headband members so as to permit adjustment of the head size of the rigging. A helmet rigging of this type is shown and claimed in my U.S. Patent No. 2,983,923, issued May 16, 1961.

On the inner concave surfaces of the shell 501 on either side of the headstrap 503 there is bonded a cushion 507 of compressible material, such as sponge rubber or one of the more energy absorbing plastic sponge materials.

A particular improvement in this rigging which is concerned in the present invention is the provision of headstrap movement limiting means comprising a pair of inelastic straps 508, 509. Each of the straps 508, 509 is fastened at its ends to the shell 501, as by means of screws 510 and nuts 511, as seen in FIG. 18. The straps 508 and 509 are substantially shorter than the dimensions between the two screws 510 along the inner concave surface of the shell 501 so that the straps are necessarily always spaced inwardly of the shell 501. Consequently, when an external blow is struck against the shell, acting on the shell, for example, in the direction indicated by the arrows 512 in FIG. 19, it may force the shell towards the headband 504, but as the shell 501 moves toward the headband 504, the strap 508 moves with the shell and comes into engagement with the headband 504 first, and is effective flexibly to force the headband and the wearer's head in the direction of the blow and away from the oncoming shell. Consequently, contact between the shell 501 and the headband 504 is prevented, and the impact of the external blow cannot be transmitted directly to the wearer's head.

The cushions 507 are slotted at 507a to permit passage of the straps 508 and 509 through the cushions from their points of attachment to the shell.

Figure 20:
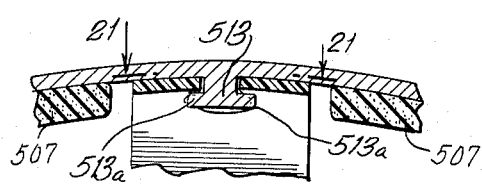
FIG. 20 is a sectional view along the line 20—20 of FIG. 16.
Figure 21:
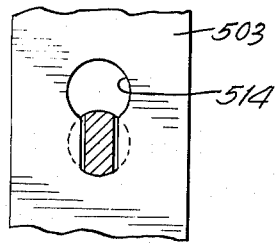
FIG. 21 is a sectional view along the line 21—21 of FIG. 20.

The rigging 502 is attached to the shell by means of a pair of inwardly projecting lugs 513, which may be integral with the shell (see FIGS. 17 and 20) and which are provided at their inner ends with a flanged head 513a. The heads 513a of the lugs 513 are insertable through the wide ends of a pair of keyhole slots 514 formed in the headstrap 503. This method of attachment of the rigging to the shell is shown and claimed in my copending application Serial No. 141,866 filed September 29, 1961.

On the underside of the headstrap 503, adjacent the crown of the helmet, there is provided a crown pad 515. The crown pad 515 is shown as consisting of two layers 515a and 515b. The layer 515a consists of a compressible material of high energy absorbing qualities, while the layer 515b consists of a somewhat softer compressible material, such as sponge rubber. The layer 515b is of course intended to directly engage the top of the wearer's head.

When the rigging is in place in the helmet, the resilience of the plastic headstrap 503 holds the keyhole slots with the small ends against the lugs 513. In order to remove the rigging from the shell, the central portion of the headband 503 must be moved downwardly, and the slotted portions of the headband must be slipped toward the crown of the helmet so that the large ends of the slots move into alignment with the heads of the lugs 513. In order to assist in the removal of the rigging from the helmet, there is provided a loop of cord 516 which extends over the top of the headband 503 and through the crown pad 515, with enough slack below the crown pad 515 to permit the insertion of a finger. The rigging may be removed from the helmet simply by inserting a finger through the loop of cord 516 and pulling downwardly. The central portion of the headband 503 then buckles and the slotted portions move upwardly so that the large ends of the keyhole slots become aligned with the lugs 513, and the entire rigging may be removed quickly and easily from the helmet.

It is desirable to be able to remove the rigging from the helmet, either for replacement purposes or for cleaning of both the rigging and the helmet.

While I have shown and described certain preferred embodiments of my invention, other modifications thereof will readily occurs to those skilled in the art, and I therefor intend my invention to be limited only by the appended claim.

I claim:

1. A helmet, comprising:
 (a) a rigid shell adapted to receive the head of a wearer;
 (b) headband means within and spaced from the shell and adapted to engage the head of a wearer;
 (c) means connecting the headband means to the shell, said connecting means including loose coupling means to accommodate shifts in the position of the headband means toward and away from the shell;
 (d) means for adjusting the headband means to fit different head sizes, said adjustment means being effective to shift at least a portion of the headband means toward and away from the shell; and
 (e) means to limit the movement of said portion of the headband means toward the shell at a substantial distance from the shell, said means comprising an inelastic strap of fixed length extending between two points on the shell respectively adjacent to the ends of said portion of the headband means, said strap having a dimension between those points substantially smaller than the distance between the same points measured along the concave inner surface of the shell, and said strap being disposed between said portion of the headband means and the shell.

2. A helmet as defined in claim 1 in which:
 (a) said headband means comprises front and rear headband sections separately movable toward and away from the shell; and
 (b) said movement limiting means comprises two inelastic straps of fixed length, one for each of the front and rear headband sections, each of said straps extending between two points on the shell respectively adjacent the ends of its associated headband section, said points being separated by a concave portion of the inner surface of the shell; and
 (c) each of said straps being disposed between its associated headband section and the shell and each of said straps being of a fixed length between its two associated points substantially smaller than the distance between the same points measured along the concave inner surface of the shell.

3. A helmet as defined in claim 1, in which:
 (a) said portion of said headband means comprises an elongated tubular member open at both ends and having an inner side adapted to engage the wearer's head and two openings in the outer side spaced from its ends; and
 (b) said inelastic strap of fixed length extends from one of said points through one of the open ends of the tubular member, out through one of said openings, in through the other opening, and out through the other open end of the tubular member to the other of said points, so that between said openings it is disposed between said tubular member and the shell.

4. A helmet, comprising:
 (a) a rigid shell adapted to receive the head of a wearer;
 (b) headband means within and spaced from the shell, said headband means comprising front and rear headband sections respectively adapted to engage the forehead and the back of the wearer's head;
 (c) headstrap means comprising a middle headstrap adapted to extend from front to back over the middle of the wearer's head and two diagonal headstraps each adapted to extend from one side of the wearer's head at the front to the other side at the back;
 (d) means connecting the ends of the headstraps to the shell, said means including a loop at each end of each headstrap; and
 (e) means connecting the headband means to the shell, comprising:
  (1) three rear headband loops fixed to the rear section of the headband means and interlinked respectively with the three headstrap loops at the rear ends of the headstraps;
  (2) only one front headband loop, fixed to the middle of the front section of the headband means and interlinked with the headstrap at the front end of the middle headstrap; and
  (3) inelastic connections between each end of the front headband means and the shell.

5. A helmet as defineed in claim 4, in which:
 (a) each said headband section comprises an elongated tubular member; and
 (b) said headband means further comprises head size adjusting means including:
  (1) draw strap means interengaged with both tubular members; and
  (2) means to vary the effective length of the draw strap means.

6. A helmet, comprising:
 (a) a rigid shell adapted to receive the head of a wearer;
 (b) headband means within and spaced from the shell, said headband means comprising front and rear headband sections respectively adapted to engage the forehead and the back of the wearer's head, and each said headband section comprising an elongated tubular member; and (c) said front tubular member is open at both ends and provided in its outer side with two vertical slits, each spaced from an end of the member; and (d) said headband means further comprises head size adjusting means including draw strap means interengaged with both tubular members, said draw strap means extending from a point of engagement with one end of the rear tubular member into the adjacent open end of the front tubular member, out through the nearest vertical slit, along the outside of the front tubular member, in through the other vertical slit, and out through the other open end to the front tubular member to a point of engagement with the other end of the rear tubular member; and (e) said headband means further comprises head size adjusting means including means to vary the effective length of said draw strap means located in the portion of the draw strap means disposed along the outside of the front tubular member.

(f) headstrap means comprising a middle headstrap adapted to extend over the middle of the wearer's head and two diagonal headstraps each adapted to extend from one side of the wearer's head at the front to the other side at the back;

(g) means connecting the headstrap means to the shell, said means including a loop at the rear end of each headstrap, and a loop at the front end of only the middle headstrap;

(h) means connecting the headband means to the shell, including loose coupling means to accommodate relative movement with respect to the shell of that portion of the headband means adjacent to each headstrap loop, said loose coupling means comprising three rear headband loops fixed to the rear section of the headband means and interlinked respectively with the three headstrap loops at the rear ends of the headstraps, and only one front headband loop, said front headband loop being fixed to the middle of the front section of the headband means and interlinked with the headstrap at the front end of the middle headstrap; and (i) said means connecting the headband means to the shell further comprises inelastic connections between each end of the front headband tubular member and the shell.

7. A helmet as defined in claim 6, comprising:
(a) means to limit the movement of said front tubular member toward the shell, including
   (1) said inelastic connections between each end of the tubular member and the shell; and
   (2) an inelastic reinforcing member extending longitudinally of said tubular member between said slits.

8. A helmet as defined in claim 5, in which:
(a) said draw strap means comprises a front draw strap and a rear draw strap, said draw straps being interengaged respectively with the front and rear tubular members, and having overlapping ends at both sides of the helmet; and
(b) said length varying means comprises means to connect each pair of overlapping draw strap ends with a selectively variable overlap distance.

9. A helmet as defined in claim 8, in which:
(a) the front tubular member is open at both ends and has two vertical slits in its outer side, each adjacent but spaced from one of the open ends; and
(b) said headband means includes means to limit the movement of the front tubular member toward the shell, comprising an inelastic strap of fixed length attached at its ends to two points on the inner surface of the shell at the left and right-hand sides thereof, said strap extending from one of said points through the adjacent open end of the front tubular member, out through the nearest slit, along the outside of the tubular member, in through the other slit, and out through the other open end of the tubular member to the other of said points.

10. A head covering including:
(a) a rigid shell adapted to receive the head of a wearer;
(b) a rigging attached to the shell and adapted to engage the wearer's head, said rigging comprising;
   (c) a tubular headband disposed so as to extend horizontally along and to engage a given portion of the head of the wearer, said tubular headband being open at the ends thereof;
   (d) a second headband disposed so as to extend horizontally along and to engage another portion of the head of the wearer horizontally spaced from said first portion, said second headband having tubular portions at least at the ends thereof, said tubular portions being open at said ends and being provided in the wall thereof disposed outwardly with respect to the head of the wearer with slits spaced from the respective ends of said second headband;
   (e) a draw strap extending from said first tubular headband through the open end portions of said second headband and through said slits with the ends of said draw strap disposed between said slits and outwardly of said outer wall of said second headband;
   (f) means connecting said ends of said draw strap and providing for adjusting the length of said draw strap about the head of the wearer to bring said headbands into proper engagement with the head; and
   (g) means connecting said headbands to said shell for supporting said shell on said headbands when in engagement with the head.

11. A head covering including:
(a) a rigid shell adapted to receive the head of a wearer;
(b) a rigging attached to the shell and adapted to engage the wearer's head, said rigging comprising;
   (c) a tubular headband of flexible material disposed so as to engage the back part of the head, said tubular headband being open at the ends thereof;
   (d) a second headband of flexible material disposed so as to engage the forehead of the wearer and to extend horizontally about the head, said second headband having tubular portions at least adjacent to the ends thereof, said tubular portions being open at said ends and being provided in the wall thereof disposed outwardly with respect to the head of the wearer with slits spaced from the respective ends of said second headband;
   (e) a draw strap extending from said first tubular headband and through said tubular end portions of said second headband and through said slits with the ends of said draw strap disposed between said slits and outwardly of said outer wall of said second headband;
   (f) means connecting said ends of said draw strap and providing for adjusting the length of said draw strap about the head of the wearer to bring said headbands into proper engagement with the head, and means connecting said headbands to said shell for supporting said shell on said headbands when in engagement with the head.

12. A head covering as defined in claim 10 in which each of said headbands is made of flexible material and is provided with a flexible fabric reinforcement secured to the wall of the headband disposed toward the shell.

13. A head covering as defined in claim 12 in which said reinforcing means is a fabric tape sewed to said wall of said headband disposed toward the shell.

14. A head covering as defined in claim 10 which comprises resilient padding within at least a given one of said tubular headbands and disposed at the wall of said headband which engages the head of the wearer, the portion of said draw strap within said given tubular headband being disposed between said padding and the outer wall of said headband so that said draw strap bears on said resilient padding.

15. A head covering as defined in claim 10 which comprises:
(a) a saddle strap secured to at least a given one of said headbands at the exterior surface thereof disposed toward the shell, and
(b) a fabric loop passing between said given headband and said saddle strap and enclosing said saddle strap, said loop being secured to said shell for supporting said shell from said headband and for disposing said shell and said given headband in spaced relation to each other, said loop and said saddle strap cooperating to hold said shell against substantial movement thereof in the direction from said given headband engaged with the head.

16. A head covering as defined in claim 10 which comprises:
(a) a saddle strap secured to said second headband at the exterior surface thereof disposed toward the shell,
(b) a fabric loop passing between said second headband and said saddle strap and enclosing said saddle strap, said loop being secured to said shell for supporting said shell from said second headband and for disposing said shell and said second headband in spaced relation to each other, said loop and said saddle strap cooperating to hold said shell against substantial movement thereof in the direction away from said second headband engaged with the head.

17. A head covering as defined in claim 10 which comprises:
(a) a saddle strap secured to a given one of said headbands at the side thereof toward the shell;
(b) a head strap disposed so as to extend over the top portion of the head, said head strap being provided, adjacent a given end thereof with a loop passing between said given headband and said saddle strap and enclosing said saddle strap, said loop being secured to said shell for securing said given end of said head strap to said shell and for supporting said shell from said given headband;
(c) said loop and said saddle strap cooperating to hold said shell against substantial movement thereof in the direction away from said given headband, said head strap being secured at the other end thereof to said shell.

18. A head covering as defined in claim 17 in which said head strap is provided with means for adjusting the length of said head strap between said loop and said other end thereof.

19. A head covering as defined in claim 17, in which said head strap is provided with a buckle connected to said loop and engaging an adjacent portion of said head strap for adjusting the length of said head strap between the ends thereof.

20. A head covering as defined in claim 17 which comprises:
(a) a plurality of said head straps disposed so as to extend over the head of the wearer in angular relation to each other adjacent the crown of the head;
(b) a plurality of said saddle straps carried by said given headband in spaced relation along said headband at the side of said headband toward said shell;
(c) the respective head straps passing between said given headband and the respective saddle straps and being formed with loops enclosing the respective saddle straps, said loops being secured to the shell to provide for supporting said shell from said head straps;
(d) said loops and the respective saddle straps cooperating to hold said shell in said spaced relation to said given headband against substantial movement in the direction away from said given headband.

21. A head covering as defined in claim 5, which comprises means connected to said tubular end portions of said front headband and connected to said shell for holding said tubular end portions with respect to said shell upon shortening and lengthening of the length of said draw strap.

References Cited by the Examiner

UNITED STATES PATENTS

| | | | |
|---|---|---|---|
| 2,371,712 | 3/1945 | Scholl | 2—3 |
| 2,802,212 | 8/1957 | Finken | 2—3 |
| 2,855,605 | 10/1958 | Aileo | 2—3 |
| 2,861,271 | 11/1958 | Lee et al. | 2—3 |

JORDAN FRANKLIN, *Primary Examiner.*